United States Patent [19]

Orel

[11] 4,177,045

[45] Dec. 4, 1979

[54] SELF-ACTING SMOKE SORBING DEVICE

[76] Inventor: Jeannette V. Orel, 10501 Wilshire Blvd., Los Angeles, Calif. 90024

[21] Appl. No.: 923,100

[22] Filed: Jul. 10, 1978

[51] Int. Cl.[2] .......................... B03C 3/36; B03C 3/38; B01D 50/00

[52] U.S. Cl. .......................................... 55/102; 55/106; 55/124; 55/212; 55/318; 55/385 G; 55/471; 55/473; 55/DIG. 34; 131/238

[58] Field of Search ................. 55/102, 105, 106, 124, 55/210, 212, 318, 385 G, 471, 473, DIG. 34; 131/238; 340/629

[56] References Cited

U.S. PATENT DOCUMENTS

| | | | |
|---|---|---|---|
| 2,934,648 | 4/1960 | Leupi et al. | 55/102 X |
| 3,490,466 | 1/1970 | Warnock | 131/238 |
| 3,516,232 | 6/1970 | Gilbertson | 55/385 G |
| 3,706,182 | 12/1972 | Sargent | 55/124 |
| 4,038,649 | 7/1977 | Dobrzanski | 340/629 |
| 4,043,776 | 8/1977 | Orel | 55/385 G |
| 4,119,419 | 10/1978 | Passaro et al. | 55/385 G X |

FOREIGN PATENT DOCUMENTS

| | | | |
|---|---|---|---|
| 2273488 | 1/1976 | France | 131/238 |

*Primary Examiner*—Kathleen J. Prunner
*Attorney, Agent, or Firm*—Smyth, Pavitt, Siegemund, Jones & Martella

[57] ABSTRACT

A self-acting device for filtering the smoke commonly associated with cigarettes and cigars includes an ashtray which supports a shroud for confining smoke. The shroud in turn supports a motorized fan which creates a flow of air to carry the smoke. In close proximity to the fan and also supported by the shroud is a detector which acts to sequentially sense the smoke and activate the fan motor. A portion of the detector also serves to separate a certain amount of the smoke from the air. Smoke which remains is further drawn upwards by the suction forces created by the fan through a filter before the filtered air is ultimately propelled into the immediately surrounding environment.

4 Claims, 3 Drawing Figures

SELF-ACTING SMOKE SORBING DEVICE

BACKGROUND OF THE INVENTION

1. Field of the Invention

This invention relates generally to ashtrays and particularly to apparatus used in conjunction with ashtrays for automatically and more effectively filtering the smoke associated with ashtrays.

2. Description of the Prior Art

It is well known that smoke producing objects, such as cigarettes and cigars, are commonly deposited on ashtrays and the smoke from these objects tends to permeate the air of the environment and produce a disagreeable odor. Furthermore, it is known that the smoke from these objects can be hazardous to the health of not only the person smoking the object, but also to persons who must breath the smoke in the environment. For these reasons, it is desirable to effectively filter the smoke which emanates from these objects, particularly when they are deposited in an ashtray. It is also known that the smoke deposits which form on surfaces contacted by smoke, i.e., filters, build up a residue which is considered objectionable and possibly dangerous since the residue contains the same suspect chemical components as does the smoke.

Various devices have been provided for filtering the smoke of cigarettes and the like when deposited in an ashtray. One such device is disclosed by applicant in her U.S. Pat. No. 4,043,776, issued on Aug. 23, 1977. This device consists of an ashtray which supports a shroud which in turn supports a motorized fan and filter element. The fan creates a flow of air upwards through the shroud and the filter whereupon the substantially smokeless air is propelled into the surrounding environment.

Another device as disclosed by Gilbertson in U.S. Pat. No. 3,516,232 issued on June 23, 1970. This device consists of a stand supporting an ashtray and also supporting a housing and motorized fan above the ashtray. In this device, the housing defines a passageway and the associated fan generates a flow of air through the passageway. The housing also supports a filter between the fan and the ashtray.

U.S. Pat. No. 3,490,466 discloses a smoke incinerating device in which the unburned components of tobacco smoke are incinerated so that the incinerated residue is discharged.

None of the devices of the foregoing disclosures, however, contains means for automatically energizing the motorized fan, which means also serves contemporaneously as an effective air purifier. None of these devices self activate almost instantaneously upon contact with the smoke.

Although applicant's U.S. Pat. No. 4,043,776 discloses the known most advanced smoke filtration system to date, it is not self-acting and does not include as effective a filtration system as the present invention.

The present invention offers a solution for both problems. Through the introduction of an inexpensive device, it is now possible to activate instantaneously and automatically the motorized fan upon detection of the smoke rising through the shroud. Moreover, a portion of the invention which senses the smoke also functions as an air purifier which, along with the filter similar to those disclosed in some of the prior art devices, has the capability of nearly totally eliminating the smoke contamination in the air.

Until now, all simpler prior art devices were constructed to permit manual fan motor activation only. Any attempt to adapt the devices for application of a remote-control or automatic switch would require a complex and relatively expensive modification which, among other things, would serve to detract from whatever aesthetic appeal any of these devices may have possessed. Wasted house current or battery power would often result whenever a manually operated device of the sort described herein would be left unattended in an activated state in the absence of smoke. The present invention permits the conservation of precious energy resources, no matter how small, by ensuring that the device and, particularly the electric fan motor, self-deactivates in the absence of smoke rising through the shroud.

SUMMARY

In accordance with the present invention, smoke rising from an ashtray through a shroud is detected by a sensor which concurrently separates smoke from the air and activates a motorized fan which draws smoke through the sensor and a filter for absorption therein. A shroud is provided which rests upon the upper edge of the ashtray or within which the ashtray is positioned to immediately confine the smoke emanating from the ashtray within the shroud. The shroud defines with a housing of the fan a passageway within which can be found the sensor and the filter and through which the smoke is carried by flow of the air. The shroud may be in the form of a cylinder having an opening therein to permit insertion and withdrawal of smoke producing objects from the ashtray. The shroud confines the smoke therewithin and the opening permits the entrance of appreciable quantities of fresh air into the shroud, as drawn in by the fan, to assure that the smoke does not flow out of the shroud, but instead is drawn through the sensor and, thereafter, the filter before the cleansed air is expelled into the environment. The sensor/detector is most effective when disposed centrally within the housing and within alignment of the natural flow of the smoke contained air as defined by the suction created by the fan. The motor associated with the fan can be exposed outside the passageway so that it is not contaminated by the smoke fumes.

A restricting member may be disposed between the shroud and the housing to define an opening in the passageway. The air flowing through the passageway passes through this opening. Typically, the detector can be disposed in this opening to sense the rising smoke and separate some of the same from the air. Once the fan is activated by the sensor, a continual flow of air is created assuring that the smoke contained air will not enter the environment without first undergoing substantial filtration through the filter.

In a preferred embodiment, the motorized fan has blades which, when the motor is activated, provide a flow of air radially outwards from the blades. In such an embodiment, the filter can be provided with a generally cylindrical shape and disposed circumferentially of the blades of the fan to filter the smoke contained there passing therethrough. The filter is easily removeable to facilitate replacement of the same.

It has also been found desirable to achieve a total filtration of the smoke particles, if possible. The versatility of this invention becomes apparent through its ability to utilize the identical means to contemporaneously sense and separate the smoke. This added and unique purifying ability enables a portion of the smoke to be removed from the air prior to its being filtered by the filtering means located generally in closer proximity to the fan blades. This invention thus provides for energy and environmental savings as no other device of the prior art has done.

These and other features and advantages of the invention will become more apparent with a discussion of preferred embodiments and reference to the associated drawings.

DESCRIPTION OF PREFERRED EMBODIMENTS

Figure 1:
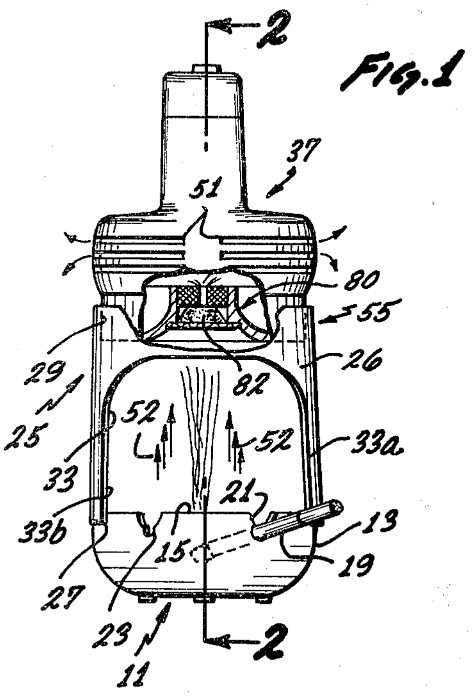
FIG. 1 is a front elevational view of a combination of the present invention including an ashtray, a shroud, a motorized fan, and a smoke detector means.

An ashtray is illustrated in FIG. 1 and designated by the reference numeral 11. The ashtray 11 has walls 13 which extend to an upper rim 15. This upper rim is provided with depressions 17 having a configuration particularly adapted for supporting a cigarette 19, a cigar, or other smoke producing object. For example, the depressions 17 can have the configuration of a portion of a large circle 21, defined in proximity to the rim 15, and a portion of a small circle 23, defined beneath the larger circle 21. In a preferred embodiment, the small circle 23 has a diameter corresponding to the diameter of the cigarette 19, and the large circle 21 has a diameter corresponding to the diameter of, for example, a cigar. Thus, the circles 21 and 23 facilitate the support of both a cigar and a cigarette by the ashtray 11.

When a smoke producing object, such as a cigarette 19, is lit, it tends to give off smoke, particularly when it is disposed in the ashtray 11 as shown in FIG. 1. If this smoke is permitted to permeate the environment of a room, for example, it can be injurious to the health of those who must breathe the smoke in the room. The smoke also tends to give off a disagreeable odor which is particularly obnoxious to a non-smoker. The device of the present invention is particularly useful in confining the smoke to a passageway inside a shroud, drawing a flow of air from the passageway through a filter to sorb the smoke prior to exhausting the air into the environment. It is, perhaps, even more useful in that it performs the foregoing process automatically in the presence of smoke.

Figure 2:
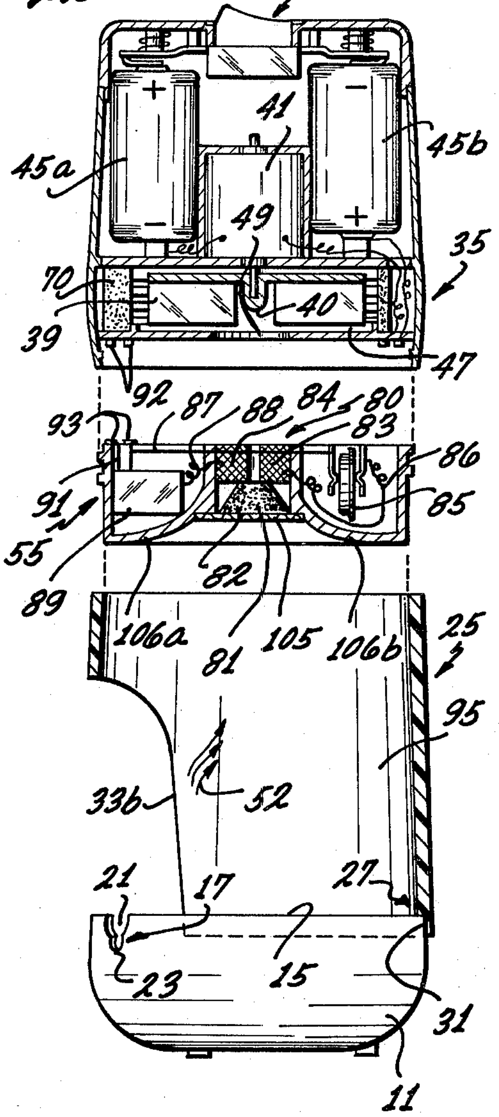
FIG. 2 is a cross-sectional view of the combination taken on line 2—2 of FIG. 1.
Figure 3:
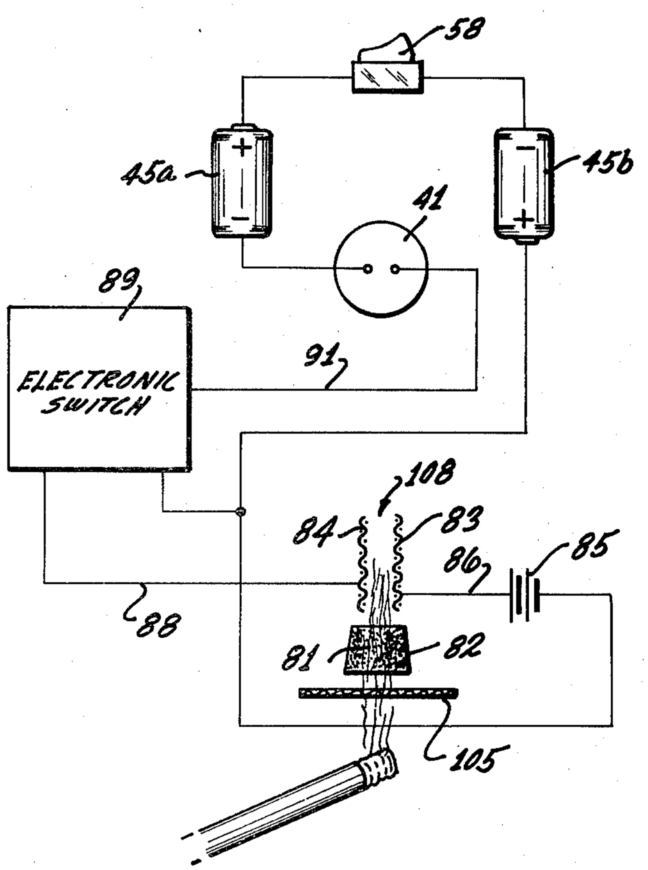
FIG. 3 is a schematic diagram of the electronic circuitry embodied in the present invention.

To facilitate the confinement of the smoke from the cigarette 19 to a restricted area, a shroud 25 can be provided to extend above the ashtray 11. In the embodiment illustrated in FIGS. 1 and 2 the shroud 25 has an elongated generally cylindrical configuration formed by wall 26 which is provided with an opening 27 at the bottom end of the shroud 25 and an opening 29 at the opposite or top end of the shroud 25. The wall 26 of the shroud 25 can have a cylindrical or slight conical configuration as illustrated in FIGS. 1 and 2.

As shown, the wall 26 next to the bottom opening 27 is provided with a circumferential shoulder 31 to facilitate disposition of the shroud 25 directly on the rim 15 of the ashtray 11 such that a portion of the shroud contacts the wall 13 of the ashtray. This direct contact between the wall 26 and the ashtray 11 is particularly desirable to maintain the smoke from the cigarette 19 within the confines of the shroud. An opening or mouth 33, is provided in wall 26 to extend along the side of the shroud 25 generally above the opening 27 and the rim 15 of the ashtray 11. This mouth 33 provides access to the ashtray 11 to facilitate the removal and replacement of the cigarette 19. It will be apparent that the shroud 25 and ashtray 11 can be made as a single unit.

As shown, the mouth or opening 33 extends above the ashtray to near the top opening 29 to provide a substantial opening in the axial direction. Circumferentially there is also a substantial opening with the side walls **33*a* and 33*b* of the opening being recessed back, as shown in FIGS. 1 and 2, in chordal relation across the ashtray to provide easy access to the ashtray. In this way, the shroud surrounds a substantial portion of the ashtray to form an enclosure, while the walls 33*a* and 33*b* are recessed back thus exposing a substantial portion of the rim of the ashtray which extends beyond the side walls 33*a* and 33*b*** of the shroud mouth. Also, the opening is of a substantial size both in transverse and axial dimension so that a substantial volume of fresh air may be drawn into the shroud to assure that the smoke remains within the confines of the shroud. With an opening of substantial size, easy access is provided to the ashtray without the necessity of having to insert the cigarette or cigar through a small opening.

An air moving means, such as a motorized fan 35, is supported by the shroud 25 above the ashtray 11. More specifically, the fan 35 is contained within housing 37 within which are also disposed a plurality of fan blades 39 radiating from a hub 40 for driving the fan blades 39. Blades 39 are contained specifically within fan blade cavity 47. Batteries **45*a*, 45*b* are located generally laterally of motor 41, all of which are also contained within housing 37. The shroud 25 provides a cavity 95 which extends between the fan 35 and the ashtray 11. Opening 49 contained in housing 37 communicates with the cavity 47 and ultimately the cavity 95. The housing 37 also includes discharge openings 51 which extend from the cavity 47 to the environment. Thus, the housing 37 defines with the shroud 25 a passageway through the unit which extends from the mouth 33 in proximity to the ashtray 11, through the top opening 29 of the shroud 25, and the openings 49 and 51 in the housing 37**.

In the embodiment illustrated, the fan blades 39 function to provide the air in the opening 49 with a circular flow pattern. As this air flows around the cavity 47, a centrifugal force is exerted upon the air which tends to make it move radially outwardly of the fan blades 39. This radially moving air is exhausted through the discharge openings 51 to the environment.

As the air moves through the openings 51 a partial vacuum is formed which has its greatest magnitude at the hub 40 of the fan blades 39. In response to this vacuum, a flow of air 52 moves through the mouth 33 into the cavity 95, that is the passageway defined by the shroud 25, and through the housing 37. This flow of air 52 is illustrated throughout the drawings by arrows designated with the same reference numeral 52. The flow of air 52 extends from the environment, through the mouth 33, along the passageway, and through the openings 51 to the environment. Since this flow of air 52 begins in proximity to the ashtray 11 at the mouth 33, the smoke from the cigarette 19 is carried by the flow of air 52.

A filter 70 is provided and has a generally cylindrical configuration to facilitate its disposition between the fan blades 39 and the openings 51 in the cavity 47. The sides of filter 70 are formed of a porous material and are connected at their upper and lower portions by more rigid wall members. The porous material along with these rigid wall members cooperate to define a cavity which is preferably filled with a sorbing type substance such as activated charcoal. The charcoal serves to filter the smoke from the flow of air 52. The rigid wall portions will typically be formed from a plastic material while the porous members can be formed from any porous material such as felt, or a woven cloth or screen.

Located generally below fan 35 and supported inside shroud 25 is detector 80. Detector 80 is contained in casing 55 which may be integrally formed with housing 37, but may also be separable therefrom. Detector 80 is comprised of several elements, including a radiation source 82; positively and negatively charged electrodes 83, 84, which are positioned generally above radiation source 82; and electronic switch 89. A series of electrical lead wires extend from each of said electrodes and are routed through switch 89 for ultimate connections to batteries 45*a*, 45*b* and motor 41. Specifically, lead 86 connects electrode 83 to one pole of battery 85. Lead 87 extends from the remaining pole of battery 85 for connection to switch 89 and, then, in order, to batteries 45*b*, 45*a*, and motor 41. Lead 88 connects electrode 84 to switch 89. Lead 91 extends from switch 89 for direct connection to motor 41. Contacts 92, 93 serve, in the event that casing 55 is separable from housing 37, to bridge the circuitry of detector 80 with that of the electrical components of fan 35. An electrical circuit is completed in the following manner: smoke rising from a cigarette or like object is maneuvered by oppositely disposed convexly formed walls 106*a*, 106*b* towards radiation source 82. Source 82 contains numerous minute radioactive particles 81, such as positively charged alpha particles. The smoke penetrates screen 105, which screen acts to support source 82, and, thereafter, enters source 82. Therein a substantial amount of smoke is exposed to particles 81 and, thus, becomes positively charged as a result of contact therewith.

The rising charged particles 108 become attracted to negatively charged electrode 84. The current thus produced at electrode 84 is then detected by switch 89, generally a transistor, which switch in turn activates motor 41. The fan will thus become operational to draw any remaining smoke particles upwardly through the detector 80 and, thereafter, to propel the filtered air into the environment. The transistor acts in a conventionally known manner to complete the circuit made by the batteries 45*a*, 45*b*, motor 41, and switch 89 and respective lead wires. In the absence of additional charged particles rising through the detector 80, said current will cease. Switch 89 will sense such decrease in current and, accordingly break the circuit. The fan motor will, thus, cease to function.

Manual switch 58 may be used in appropriate situations. However, switch 58 is normally left in the on or closed position.

The accumulation of a substantial portion of the positively charged smoke particles upon the negatively charged electrode 84 results, thus, in the separation of the smoke from the air. Smoke particles that continue past electrode 84 are, for the most part, collected by filter 70 before the air is exhausted into the environment.

As explained with reference to the foregoing embodiments, the device of the present invention provides means for automatically filtering the smoke associated with cigarettes and cigars. The device is compact in size, inexpensively manufactured, and particularly attractive as a novelty gift item.

Although the device has been disclosed with reference to specific embodiments accommodating particular filter configurations, it will be obvious that the device can be otherwise embodied so that the scope of the invention should be ascertained only with reference to the following claims.

I claim:

1. A self activating smoke sorbing and filtering device comprising:

an ashtray including a wall terminating in a rim for supporting an object having a smoke producing end, such as a cigarette or the like, such that the smoke producing end is positioned within the ashtray, a shroud contacting the wall of the ashtray, said shroud including wall means extending above the ashtray and operative to confine within the shroud the smoke produced by the object positioned within the ashtray and including an aperture in the upper end of said shroud, said shroud having an opening in the wall means thereof such that the shroud contacts only a portion of the wall of the ashtray such that the smoke producing object may be inserted through the opening to rest within the ashtray, said opening defining spaced side walls of the shroud which are recessed back to expose a portion of the rim of the ashtray forward of said side walls, housing means supported solely by said shroud, said housing means having an opening generally vertically above the ashtray and said opening being in communication with said aperture, said housing means including a discharge opening spaced from said opening of said housing means and cooperating with said opening in the wall means to form a passageway extending into said housing means from the outside environment, power driven air moving means supported within said housing means and on said shroud and positioned over said opening in said housing means and within said passageway for drawing air through the opening in the wall means of said shroud and into said passageway for discharge through the opening in said housing means through the remainder of said passageway and through the discharge opening and into the environment, the movement of air through said shroud being operative to carry with it the smoke produced by said object within the confines of the shroud, detection means supported inside said shroud and contiguous to said housing means coupled electrically to said power driven air moving means for detecting smoke and purifying air, said means, on sensing said smoke, being operative to concurrently separate said smoke from said air and energize said air moving means for drawing the smoke and air through said passageway and said detection means and propelling the purified air into the environment, and, filter means supported within said housing means and radially outward of said air moving means above said detection means for filtering the once-purified air drawn through said passageway by said power driven air moving means.

2. A device as set forth in claim 1 wherein said detection means comprises:

means for charging smoke particles, electrode means which are electrically charged to a sufficient potential to attract and retain the charged smoke particles, said electrode means being positioned above said charging means so that charged particles passing therebetween are attracted to said electrodes for creating an electrical current, and, switching means coupled to said electrode means for sensing said flowing electrically charged particles, said means being responsive to said flowing electrically charged particles to activate said air moving means.

3. A device as set forth in claim 2 wherein said means for charging further comprises a radioactive source of charged particles positioned so that the air containing smoke particles is exposed to said charged particles to impart an electrical charge to said smoke particles.

4. A device as set forth in claim 3 wherein said switching means further comprises an electronic switch.

* * * * *